United States Patent
White et al.

[11] Patent Number: 6,075,341
[45] Date of Patent: Jun. 13, 2000

[54] POWER PACK CHARGING SYSTEM FOR A POWER TOOL

[75] Inventors: Paul S. White, Ellicott City; Christopher R. Walter, Baltimore; Michael P. Kunz, Hampstead; Edward A. Harrison, Abingdon, all of Md.

[73] Assignee: Black & Decker Inc., Newark, Del.

[21] Appl. No.: 09/251,599

[22] Filed: Feb. 17, 1999

[51] Int. Cl.⁷ .............................. H02J 7/00; H01B 27/00
[52] U.S. Cl. .................... 320/114; 320/113; 320/107; 439/222; 439/135
[58] Field of Search ...................................... 320/107, 112, 320/113, 114, 115; 439/152, 137, 140, 135, 222, 217

[56] References Cited

U.S. PATENT DOCUMENTS

| | | |
|---|---|---|
| 2,225,460 | 12/1940 | Porth . |
| 2,266,686 | 12/1941 | Emanuel . |
| 3,667,026 | 5/1972 | Bogut et al. . |
| 3,917,990 | 11/1975 | Sherman, Jr. . |
| 4,006,396 | 2/1977 | Bogut . |
| 4,123,598 | 10/1978 | Hammell . |
| 4,186,983 | 2/1980 | Kaye . |
| 4,315,364 | 2/1982 | Leffingwell . |
| 4,329,406 | 5/1982 | Dahl et al. . |
| 4,468,605 | 8/1984 | Fitzgerald et al. . |
| 4,530,034 | 7/1985 | Kawarada . |
| 4,576,880 | 3/1986 | Verdier et al. . |
| 4,637,965 | 1/1987 | Davis . |
| 4,737,420 | 4/1988 | Ikeda et al. . |
| 4,746,298 | 5/1988 | Hollander . |
| 4,943,498 | 7/1990 | Cooper et al. . |
| 4,969,206 | 11/1990 | Desrochers . |
| 4,997,731 | 3/1991 | Machida et al. . |
| 5,057,383 | 10/1991 | Sokira . |
| 5,111,128 | 5/1992 | Branan, Jr. et al. . |
| 5,132,800 | 7/1992 | Wada et al. . |
| 5,136,620 | 8/1992 | Eaves . |
| 5,144,217 | 9/1992 | Gardner et al. . |
| 5,151,727 | 9/1992 | Sasaki et al. . |
| 5,183,714 | 2/1993 | Mitsui et al. . |
| 5,200,686 | 4/1993 | Lee . |
| 5,200,690 | 4/1993 | Uchida . |
| 5,208,116 | 5/1993 | Joh . |
| 5,227,262 | 7/1993 | Ozer . |
| 5,229,701 | 7/1993 | Leman et al. . |
| 5,248,927 | 9/1993 | Takei et al. . |
| 5,341,171 | 8/1994 | Mori et al. . |
| 5,391,972 | 2/1995 | Gardner et al. . |
| 5,399,446 | 3/1995 | Takahashi . |
| 5,602,454 | 2/1997 | Arakawa et al. . |
| 5,620,808 | 4/1997 | Wheeler et al. . |
| 5,686,808 | 11/1997 | Lutz . |
| 5,718,985 | 2/1998 | Bunyea et al. . |

FOREIGN PATENT DOCUMENTS

| | | |
|---|---|---|
| 0 255 568 A2 | 3/1987 | European Pat. Off. . |
| 0 561 423 A2 | 3/1989 | European Pat. Off. . |
| 0 480 706 A1 | 4/1992 | European Pat. Off. . |
| 0 545 132 B1 | 11/1992 | European Pat. Off. . |
| 0 572 327 A1 | 1/1993 | European Pat. Off. . |
| 0 549 950 A1 | 7/1993 | European Pat. Off. . |
| 0 707 350 A1 | 4/1996 | European Pat. Off. . |
| 0 786 821 A1 | 2/1997 | European Pat. Off. . |
| 94 04 008 | 9/1994 | Germany . |
| 44 02 355 C 2 | 2/1997 | Germany . |
| 59-167098 | 9/1984 | Japan . |
| 3-52555 | 3/1991 | Japan . |
| 1 487 604 | 10/1977 | United Kingdom . |
| 2 184 897 | 10/1986 | United Kingdom . |
| WO 92/11679 | 7/1992 | WIPO . |

*Primary Examiner*—Adolf Deneke Berhane
*Assistant Examiner*—Gregory J. Toatley, Jr.
*Attorney, Agent, or Firm*—Harness, Dickey & Pierce, P.L.C.

[57] ABSTRACT

A power pack charging system includes a one-way compatible charger arrangement for use with multiple power pack types. In another aspect of the present invention, both of the power pack types can be used in a first charger but only one of the power pack types can be charged in a second charger.

38 Claims, 11 Drawing Sheets

POWER PACK CHARGING SYSTEM FOR A POWER TOOL

BACKGROUND OF THE INVENTION

This invention relates generally to power tools and more specifically to a power pack charging system for a power tool.

It is generally known to employ rechargeable and removable power packs for use with hand-held, cordless power tools. For example, reference should be made to the following U.S. Pat. No. 5,718,985 entitled "Battery Pack Retaining Latch for Cordless Device" which issued to Bunyea et al. on Feb. 17, 1998; U.S. Pat. No. 5,620,808 entitled "Battery Pack for Cordless Device" which issued to Wheeler et al. on Apr. 15, 1997; and U.S. Pat. No. 5,391,972 entitled "Cordless Tool Battery Housing and Charging System" which issued to Gardner et al. on Feb. 21, 1995; all of which are incorporated by reference herein.

While traditional power pack electrical connectors and chargers having proven sufficient for use with nickel cadmium ("NiCd") battery power packs, the more recently developed nickel metal hydride ("NiMH") battery power packs require a different charging circuit. Accordingly, it is not recommended that nickel metal hydride power packs be charged in a nickel cadmium charger. Charging incompatibility could lead to damaged power packs. Furthermore, nickel metal hydride power packs require an additional temperature terminal to enable the temperature of the batteries to be monitored during charging.

Other traditional battery-to-charger constructions are known which either electrically detect different battery types or only receive a specifically constructed battery case configuration. Such devices are described in U.S. Pat. No. 5,602,454 entitled "Battery Pack having Identification Recesses and Terminals" which issued to Arakawa et al. on Feb. 11, 1997; U.S. Pat. No. 5,200,690 entitled "Quick Charge Control Apparatus and Control Method Thereof" which issued to Uchida on Apr. 6, 1993; and European Patent Application No. EP 0 707 350 A1 entitled "Battery Device and Loading Device for Battery Device" which was published on Apr. 17, 1996. However, these devices are used with video tape recorder cameras or portable computers. Moreover, these conventional chargers and power packs use complicated and expensive electronic circuitry to detect the battery type and do not appear to provide one way charger compatibility for multiple battery types in a simple, economical and mechanical manner.

SUMMARY OF THE INVENTION

In accordance with the present invention, the preferred embodiment of a power pack charging system includes a one-way compatible charger arrangement for use with multiple power pack types. In another aspect of the present invention, both of the power pack types can be used in a first charger but only one of the power pack types can be charged in a second charger. Yet a further aspect of the present invention employs interchangeable power packs, of different battery materials, for a hand-held and cordless power tool. Still another aspect of the present invention provides a mechanical mechanism for preventing complete electrical connection and charging of one power pack construction by a charger suitable for use in charging another power pack construction. Furthermore, a specific electrical connector configuration provides the mechanical charger interchangeability difference between power pack types, in another aspect of the present invention. A method of using a one-way compatible power pack charging system for power tools is also provided.

The power pack charging system of the present invention is advantageous over traditional constructions in that the present invention uses a durable, low cost and reliable mechanical electrical connector-to-charger configuration. No moving parts are needed to achieve one-way compatibility for the present invention. Additionally, the present invention advantageously combines multiple features into a single electrical connector configuration. For instance, a temperature sensor electrical terminal is combined with the mechanical compatibility element. The construction of the present invention achieves fail-safe one-way charger compatibility ideally suited for use with nickel metal hydride and nickel cadmium power packs. Additional advantages and features of the present invention will become apparent from the following description and appended claims, taken in conjunction with the accompanying drawings.

DETAILED DESCRIPTION OF THE PREFERRED EMBODIMENT

Figure 1:
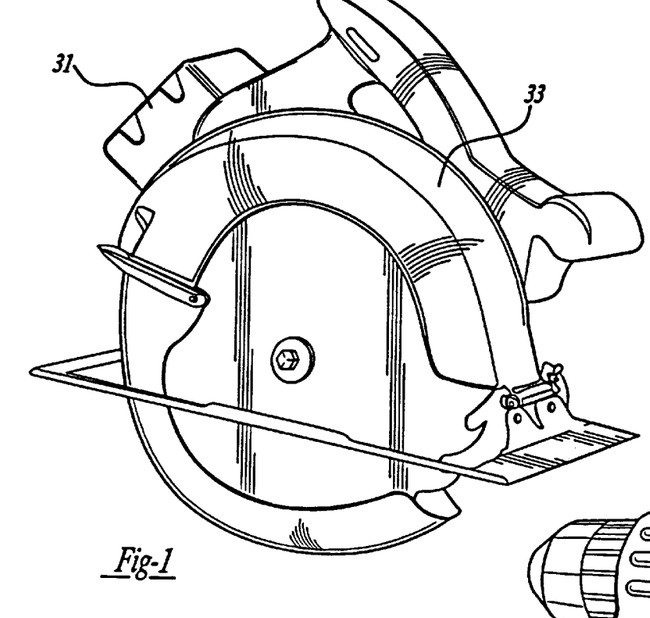
FIG. 1 is a perspective view showing a power pack of the preferred embodiment power pack charging system of the present invention employed with a saw.
Figure 2:
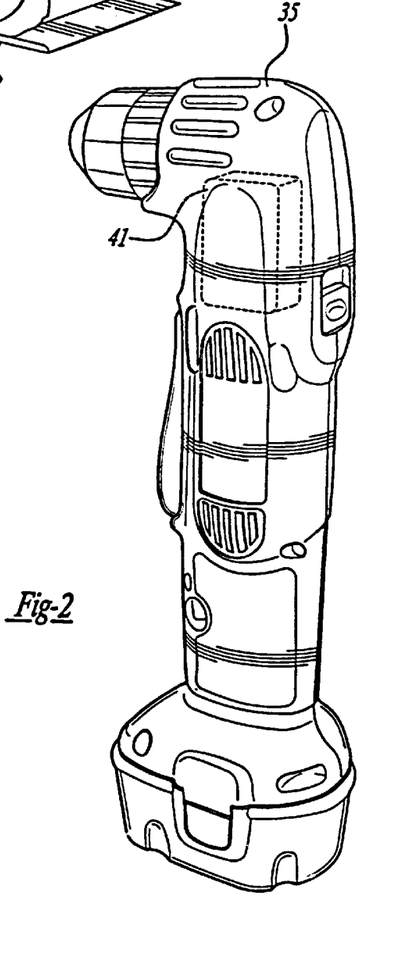
FIG. 2 is a perspective view showing the power pack of the preferred embodiment power pack charging system employed with a drill.
Figure 3:
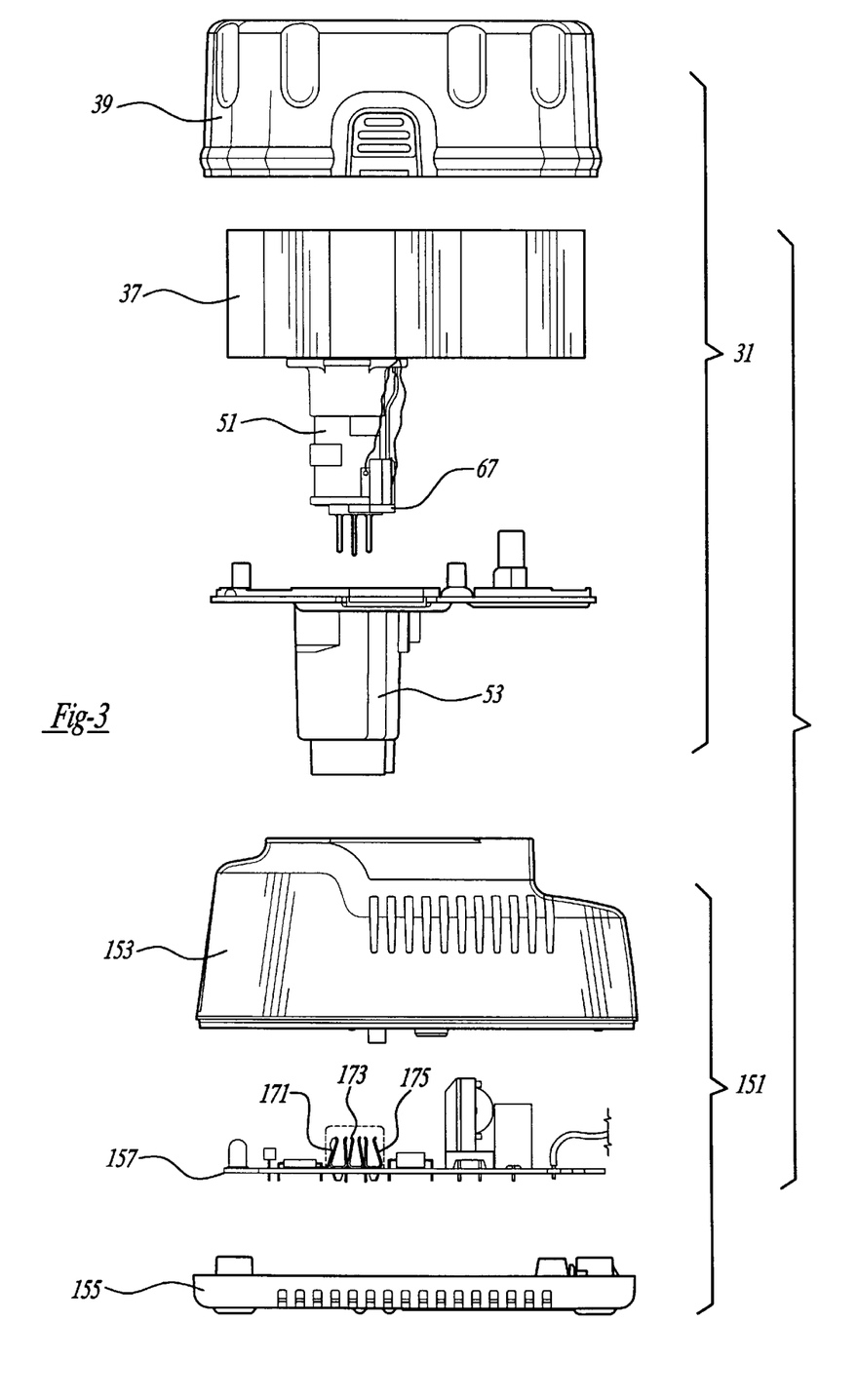
FIG. 3 is an exploded side elevational view showing the preferred embodiment power pack charging system.
Figures 4, 5, 6, 7:
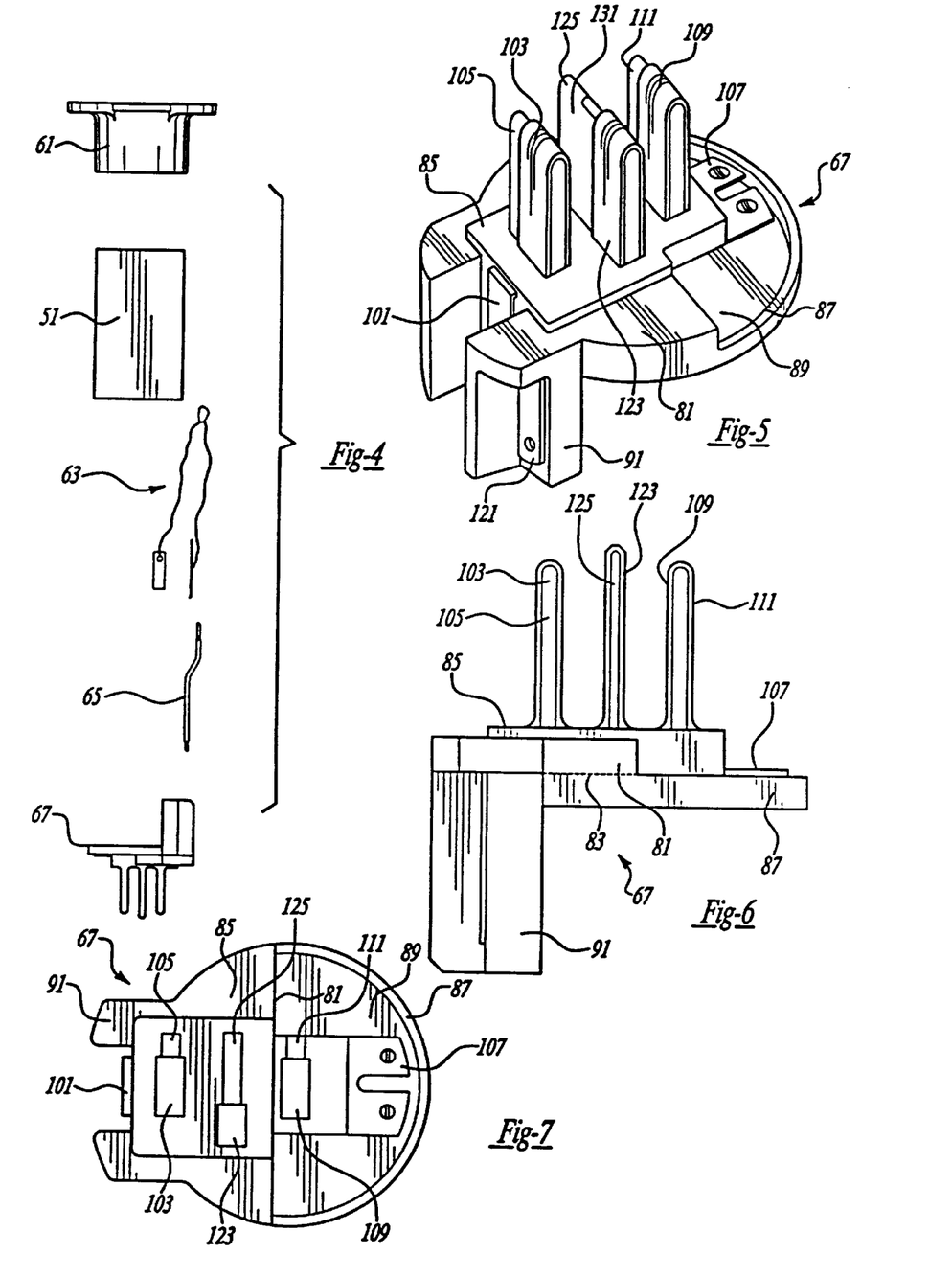
FIG. 4 is an exploded side elevational view showing a tower cell of the preferred embodiment power pack charging system.
FIG. 5 is a perspective view showing an electrical connector of the preferred embodiment power pack charging system.
FIG. 6 is a side elevational view showing the electrical connector of the preferred embodiment power pack charging system.
FIG. 7 is an end elevational view showing the electrical connector of the preferred embodiment power pack charging system.
Figure 8:
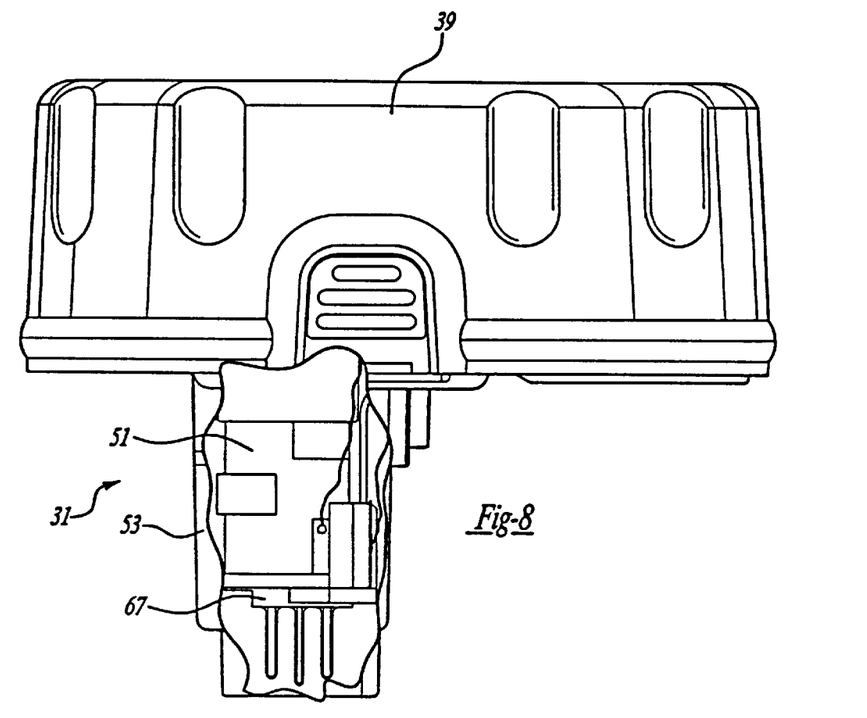
FIG. 8 is a partially fragmented side elevational view showing the power pack of the preferred embodiment power pack charging system.
Figure 9:
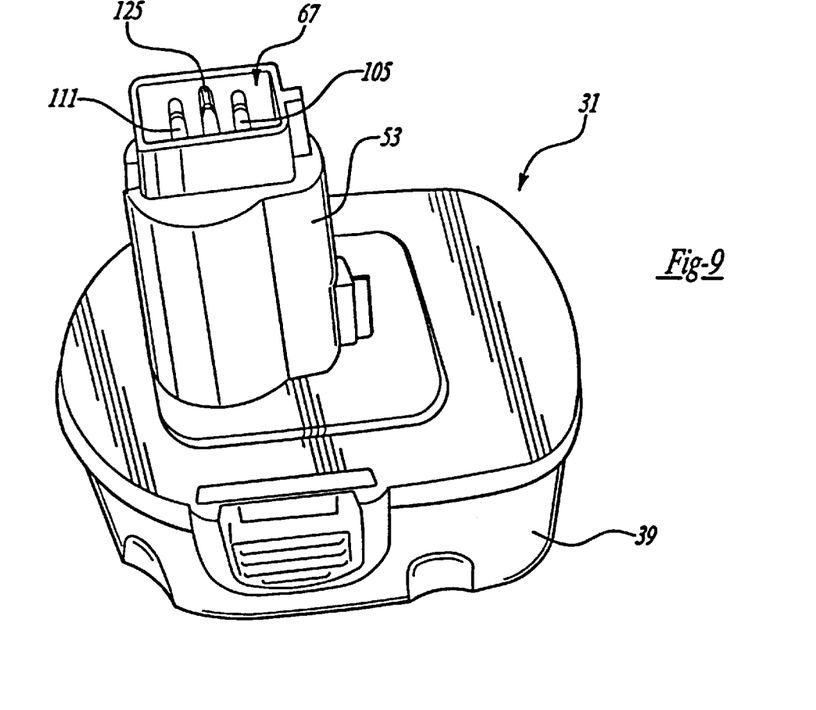
FIG. 9 is a perspective view showing the power pack of the preferred embodiment power pack charging system.
Figure 10:
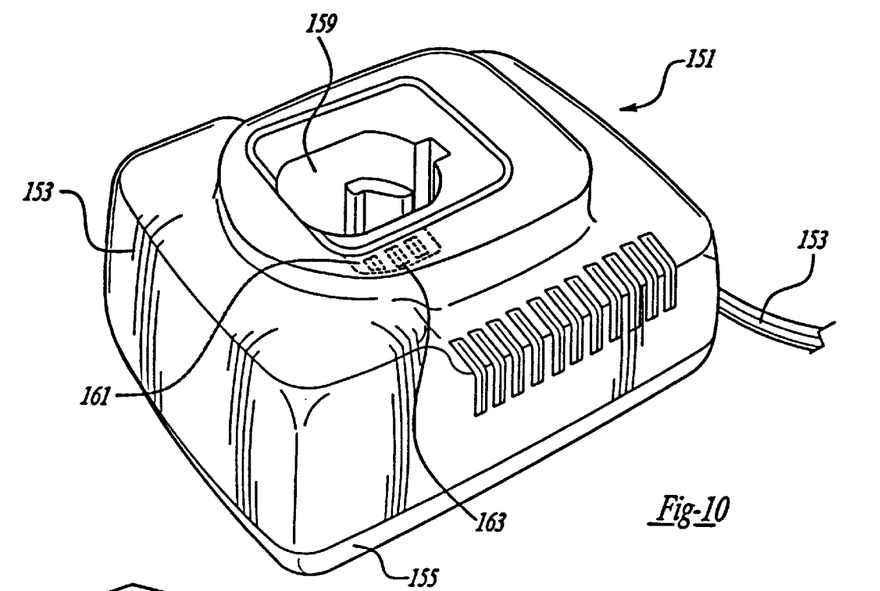
FIG. 10 is a perspective view showing a charger of the preferred embodiment power pack charging system.
Figure 11:
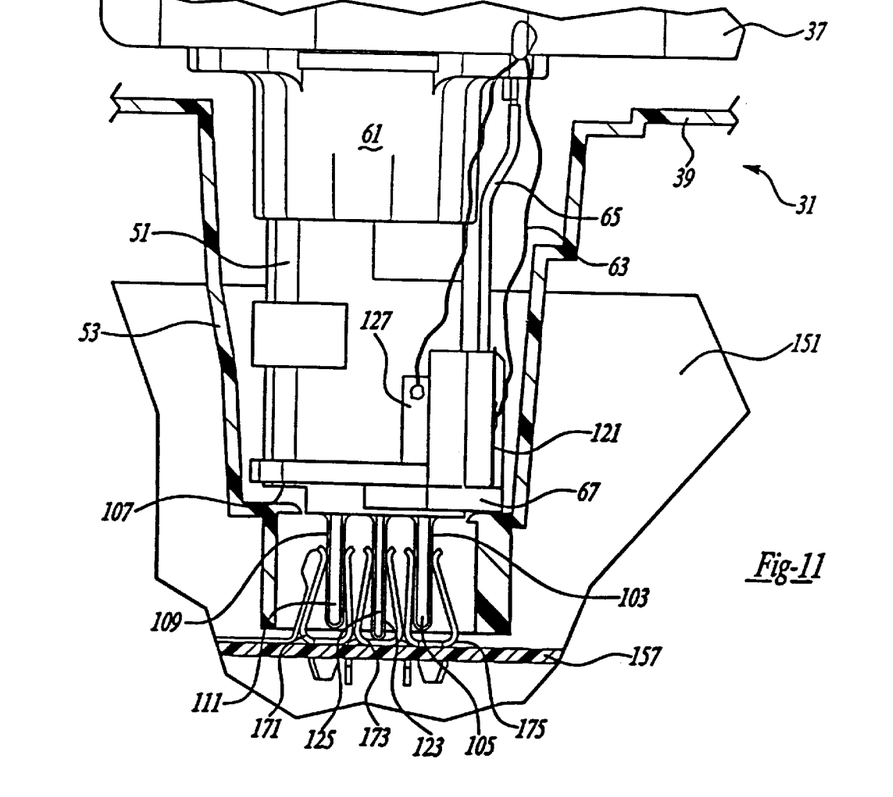
FIG. 11 is a partially fragmented side elevational view showing the preferred embodiment power pack charging system.
Figure 12:
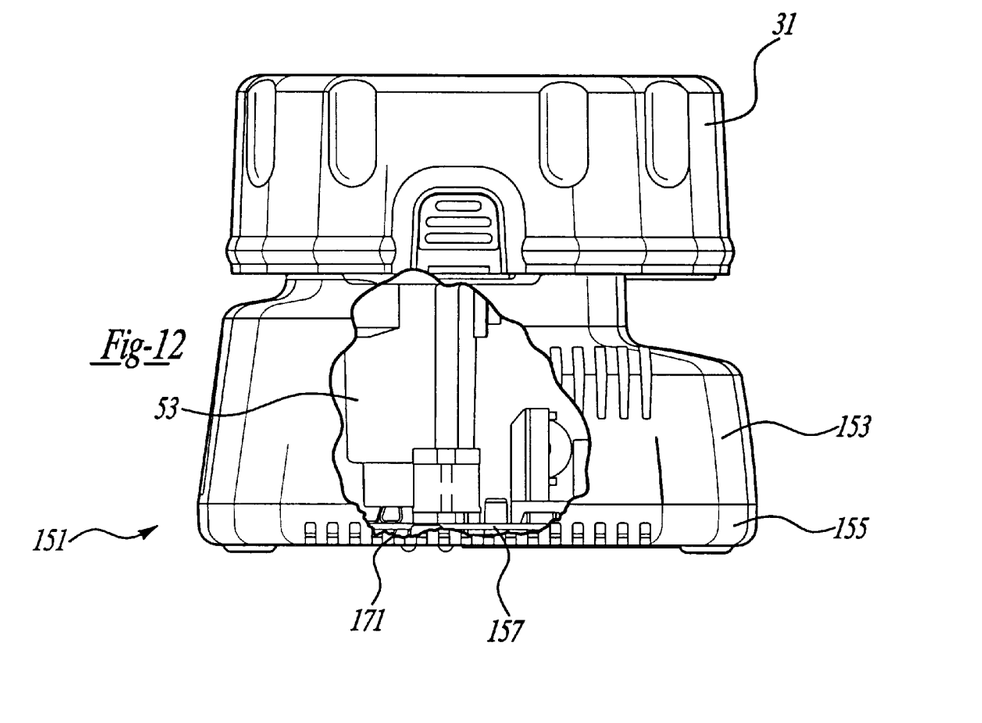
FIG. 12 is a partially fragmented side elevational view showing the preferred embodiment power pack charging system.
Figure 19:
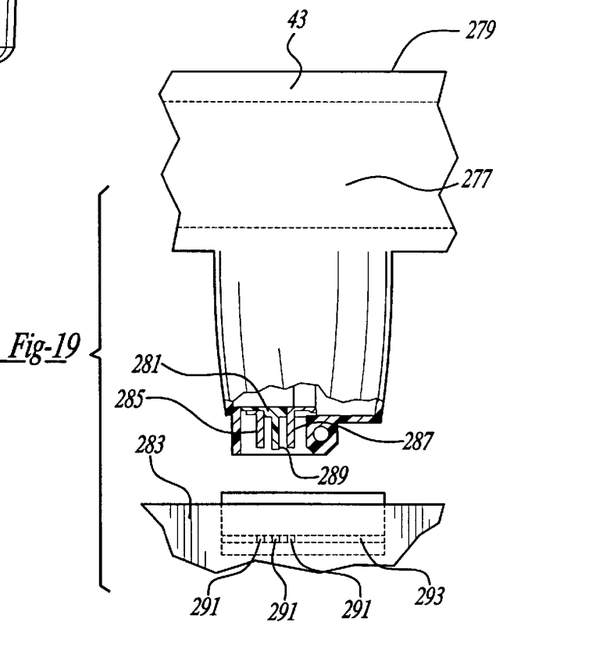
FIG. 19 is a partially fragmented side elevational view showing the alternate embodiment of the power pack charging system.

The preferred embodiment of a power pack charging system is intended for use with a hand-held, portable and cordless power tool. For example, the preferred embodiment power pack 31 is shown mounted to a cordless circular saw 33, in FIG. 1. This same power pack 31 is shown mounted to a cordless power drill 35, in FIG. 2. The preferred power pack 31 contains nickel metal hydride batteries 37 (see FIG. 3) disposed inside a protective polymeric casing 39 (also see FIG. 3). The batteries supply 18 volt, 3.0 amp hours, direct current to energize an electric motor 41 inside the power tool. FIG. 19 shows an alternate embodiment nickel cadmium battery power pack 43 which can be interchangeably mounted to the power tools in place of the preferred nickel metal hydride power pack 31, in a snap-in, disengagable manner.

Referring to FIGS. 3, 4, 8 and 9, the preferred power pack 31 further includes a tower cell 51, a tower cell housing 53, battery pack 37 and casing 39. A spacer 61, thermistor 63, 16 AWG wire 65 and electrical connector 67 are affixed to tower cell 51. Thermistor 63 can be obtained from Fenwal Electronics, Keystone Thermometrics or Alpha Thermistor. Thermistor 63, in combination with a microprocessor in the charger, serves to monitor the temperature of batteries 37 during recharging to prevent overheating and possible damage to the batteries.

FIGS. 5–7 and 11 best illustrate electrical connector or terminal block 67. Electrical connector 67 has a base 81 with a flat first face 83 and an opposite stepped face 85. Base 81 has a generally semi-circular shape. A protective ring 87 extends from a leading edge of base 81 and defines a predominantly circular shape in combination with the periphery of base 81. An opening 89 is disposed between the leading edge of base 81 and an inside surface of ring 87. An extension structure 91 is upstanding from base 81 and has a curved interior surface (not shown). Base 81, ring 87 and structure 91 are injection molded as an integrated single piece from thirty-three percent glass-filled nylon. A positive current terminal includes a lead 101, externally extending from base 81, and a U-shaped conductor 103 wrapping around a generally non-conductive blade 105. Lead 101 is electrically connected to wire 65 which, in turn, is connected to batteries 37. A negative current or ground conductive terminal includes a bifurcated lead 107, externally projecting within opening 89, and a conductor 109. Conductor 109 has a generally U-shape which is wrapped around an external surface of another generally non-conductive blade 111. The dimples of lead 107 are welded to a bottom cell of tower cell 51. A third conductive terminal includes a lead 121 externally projecting from base 81 and a conductor 123 wrapped in a generally U-shaped manner around a centrally located and generally non-conductive blade 125. Lead 121 is electrically connected to one wire of thermistor 63. The other thermistor wire is soldered to a conductive plate 127 welded to tower cell 51. The terminals are all insert molded as part of base 81 such that conductive portions are integrally hidden and attached therein. Leads 101 and 121 are angularly bent and hidden within pockets of structure 91. The terminals are all made of brass.

Furthermore, blades 105, 111 and 125 are all injection molded as part of base 81. These blades all project in a generally parallel manner to each other. Conductors 103, 109 and 125 are all offset to one side of their respective blade such that at least a portion of an external flank 131 of each blade is exposed. In the case of central blade 125, the majority of the non-conductive flanks and tip are exposed. Additionally, central blade 125 is laterally wider and slightly longer than the adjacent blades 105 and 111. Referring to FIGS. 3 and 10–13, the preferred embodiment charger 151 is operable to convert alternating current received through a plug and wire 153 to direct current for recharging nickel metal hydride batteries 37 of power pack 31. A housing of charger 151 includes an upper plastic cover 153 and a lower plastic cover 155, defining an internal cavity therein. A rigid printed circuit board 157 is mounted inside the cavity of covers 153 and 155. A recessed aperture 159 is disposed within a top surface of upper cover 153 for allowing access of tower cell cover 53 and electrical connector 67. Tower cell cover 53 is keyholed with aperture 159 of charger 151 to ensure proper mating alignment. A shelf 161 with three slots 163 is located in a horizontal manner at the bottom of aperture 159. Conductors 103, 109 and 123 of electrical connector 67, protrude through slots 163, and are received inside of and electrically connect with pincer style female receptacles 171, 173 and 175 mounted to printed circuit board 157. Receptacle 173 is laterally offset from a vertical plane defined by receptacles 171 and 175. Circuit board 157 handles 120 volts for use in the United States but can be altered from standard European or Asian voltage requirements.

Figure 13:
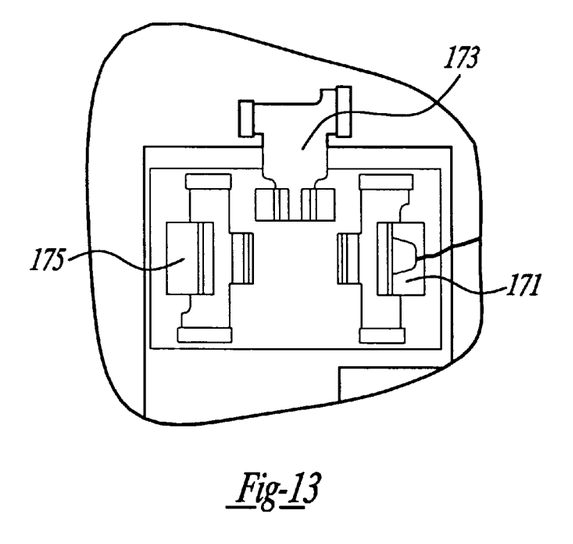
FIG. 13 is a partially fragmented top elevational view showing female receptacles of the preferred embodiment power pack charging system.
Figure 14:
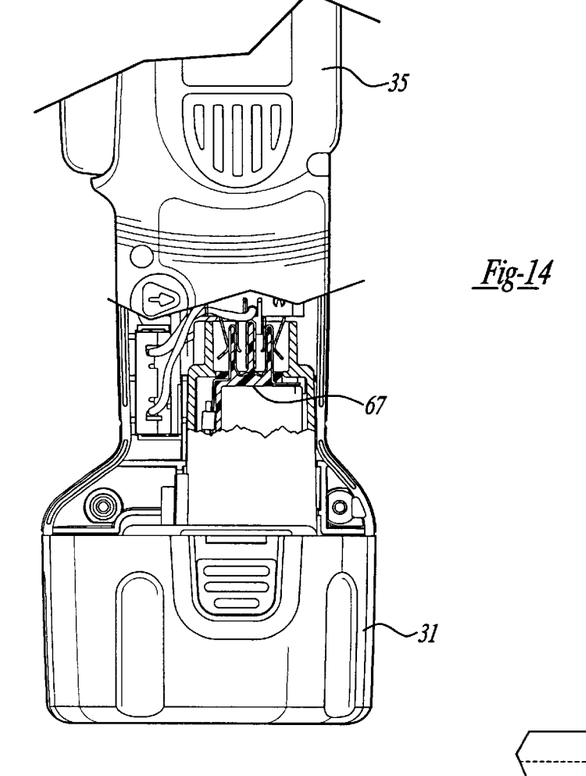
FIG. 14 is a partially fragmented side elevational view showing the power pack of the preferred embodiment power pack charging system employed with the drill of FIG. 2.
Figure 15:
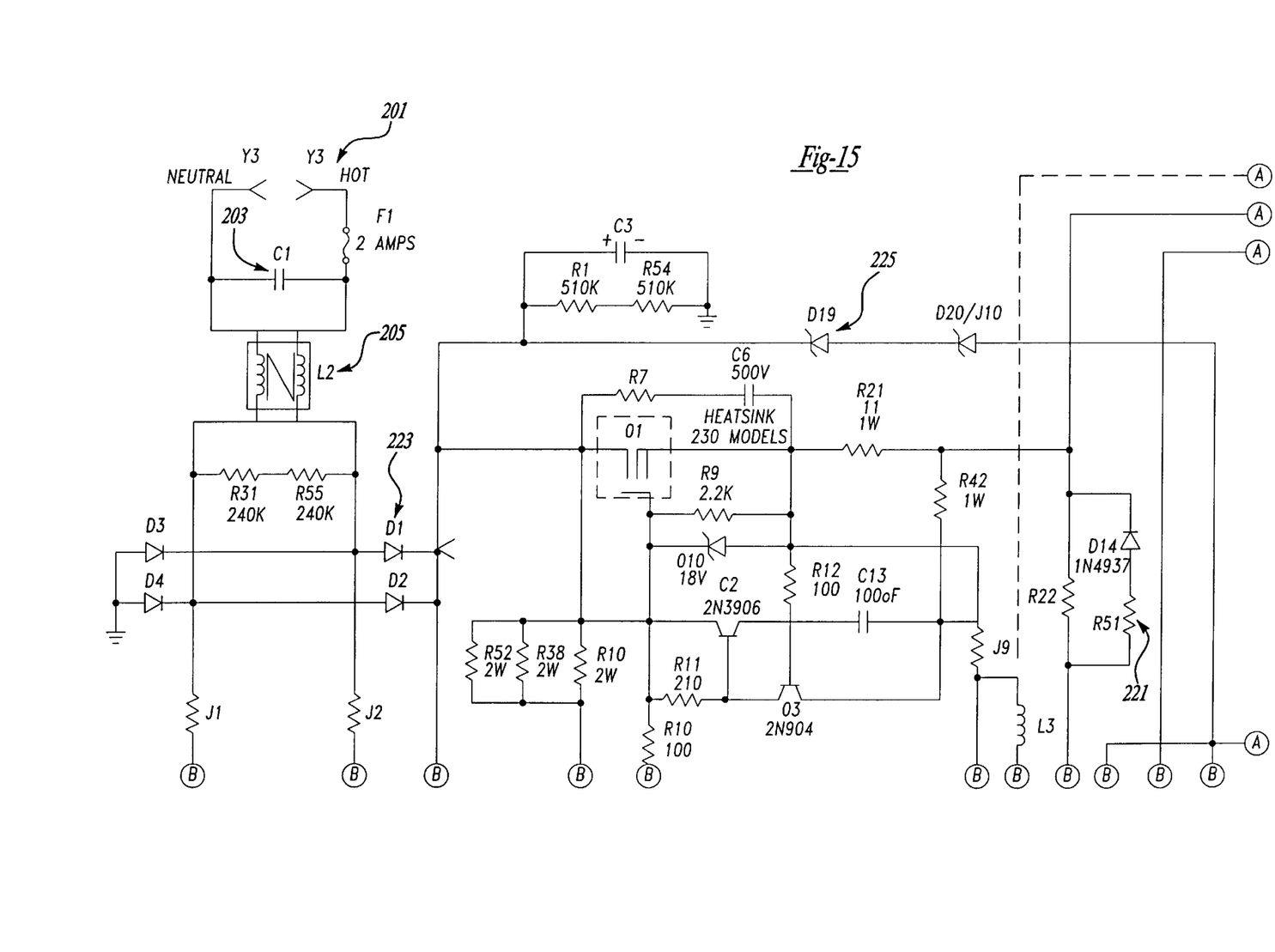
FIGS. 15–18 are schematic diagrams showing the electrical circuitry of the charger employed in the preferred embodiment power pack charging system.
Figure 16:
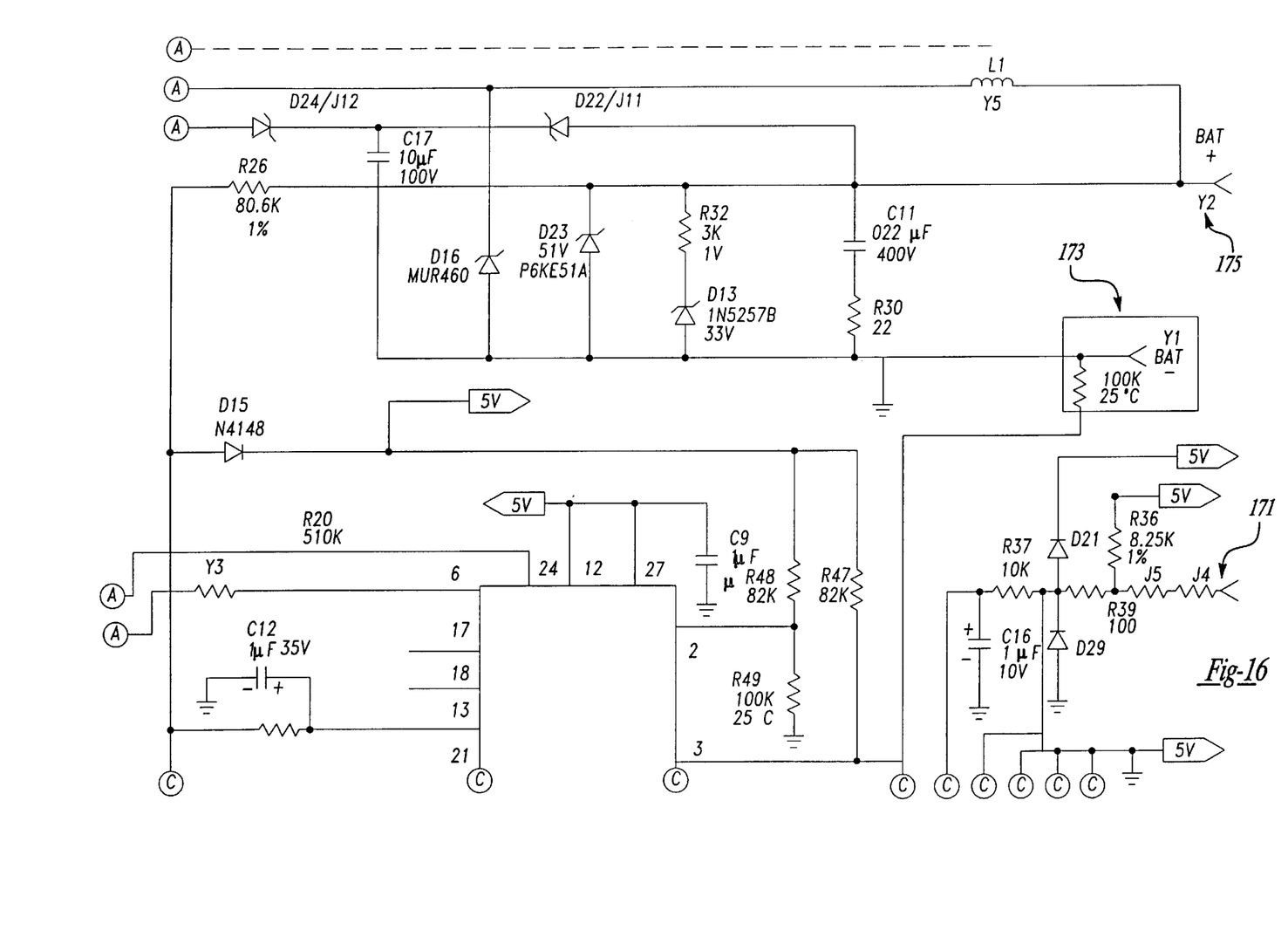
Figure 17:
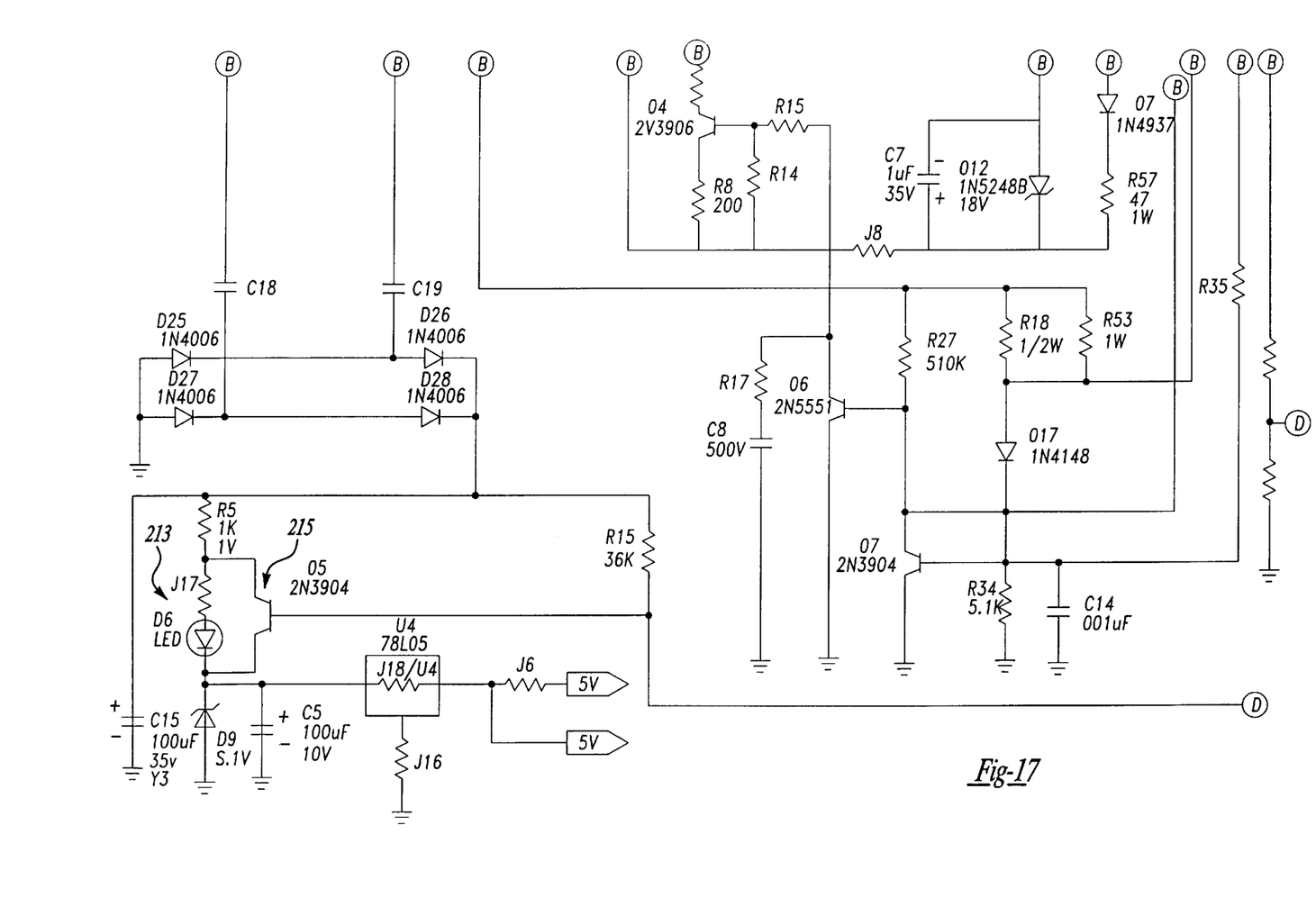
Figure 18:
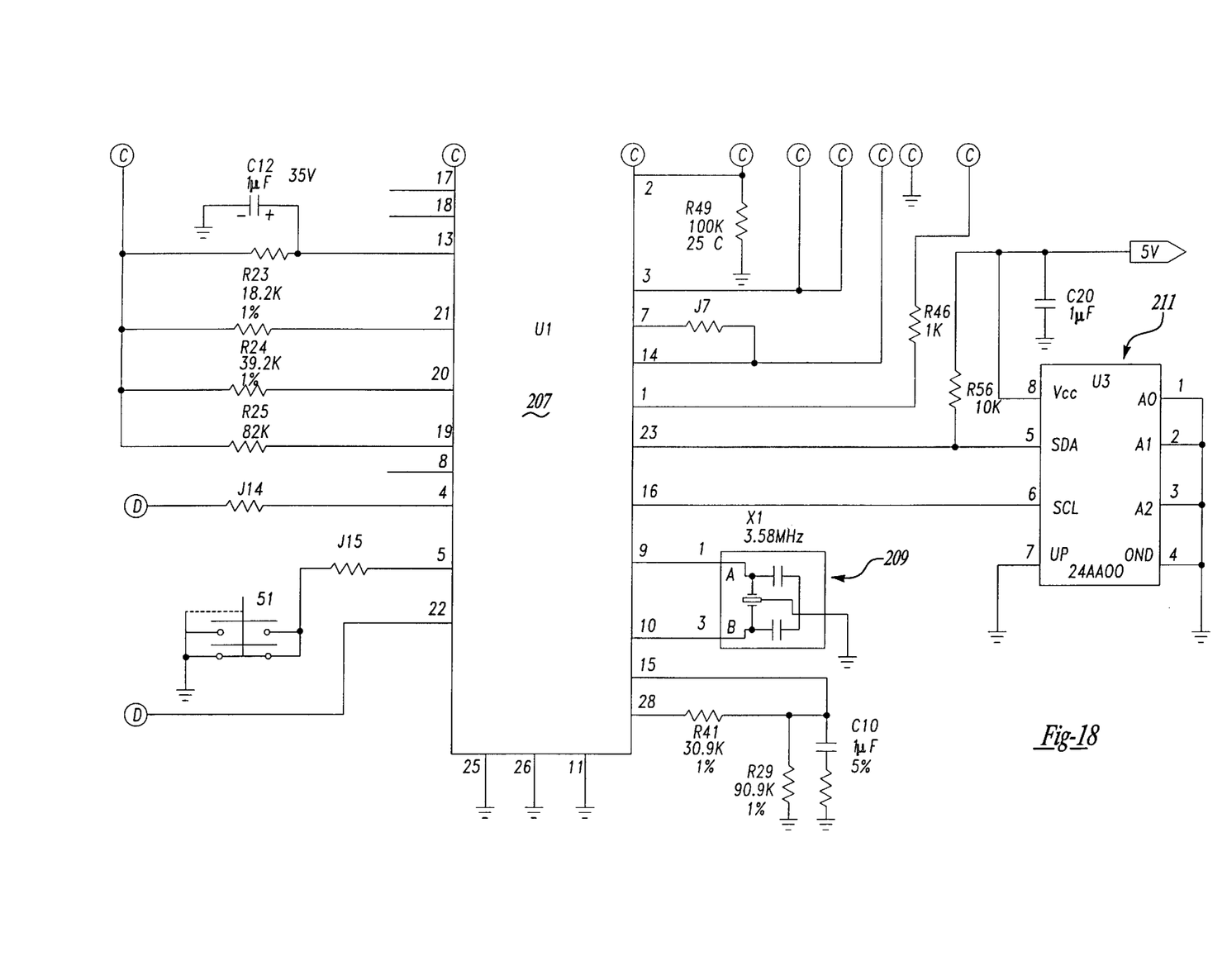

Female receptacles 171, 173 and 175 are preferably made from a phosphor bronze alloy with a nickel plating.

The circuit board electrical circuits are shown in FIGS. 15–18. The electric wall plug for receiving alternating current is shown as 201. A capacitor 203 and inductor 205 are connected to a microprocessor 207. A resonator 209 and EEPROM 211 are also connected to microprocessor 207. A light emitting diode 213 is connected to microprocessor 207 by way of a transistor 215 to indicate charging of the battery pack. The hot or positive female receptacle is shown at 175, the negative or neutral receptacle is shown at 171, and the thermistor receptacle is shown at 173. Other resistors 221, diodes 223, zener diodes 225 are also employed.

An alternate embodiment of the power pack charging system of the present invention is shown in FIG. 19. Power pack 43 uses nickel cadmium rechargeable batteries 277 disposed inside a casing 279 like that of the preferred power pack, which is interchangeably matable to the same power tools. An electrical connector 281 and a second charger 283 used with this power pack 43 are basically as disclosed in U.S. Pat. No. 5,391,972. This connector 281 has a pair of solid metal positive and negative electrical terminals 285 and 287. A center blade 289 is injection molded from a generally non-conductive plastic material as part of the base of connector 281. Thus, center blade 289 simply acts as a shield while aiding to align and secure electrical connector 281 and power pack 43 in the receptacles of nickel cadmium charger 283. Moreover, nickel cadmium power pack 43 does not require temperature monitoring during recharging, thus, no thermistor is necessary.

It is desirable to have one-way interchangeability of the different power pack varieties 31 and 43 (see FIGS. 11 and 19) with regard to the chargers 151 and 283. In other words, the nickel cadmium power pack 43 must be allowed to interface and be recharged in the older charger 283 as well as the charger 151 of the present invention. However, the nickel metal hydride power pack 31 of the present invention must only be allowed to be recharged by the present invention charger 151 which monitors the power pack temperature and changes the charging characteristics of the electric circuit, if necessary, in response to the sensed temperature. However, power pack 31 must not be allowed to be charged in the older nickel cadmium charger 283. This one-way compatibility is achieved by mechanical characteristics including enlarging the lateral width of the outer positive and negative terminals and by employing nonconductive blades 105 and 111 laterally projecting beyond their conductors, as compared to the entirely conductive and laterally smaller terminals 285 and 287 of the nickel cadmium power pack. Thus, the larger blades 105 and 111 of the nickel metal hydride power pack will abut against the smaller sides of access slots 291 in a shelf of the older charger 283, and thereby not allowing complete insertion or charging of power pack 31 is a simple yet reliable, mechanical manner. The sides of access slots 291 are only large enough to receive terminals 285 and 287, in addition to the center shield of the nickel cadmium power pack.

While various embodiments of the power pack charging system have been disclosed, it should be appreciated that other variations may be employed within the spirit of the present invention. For example, the receptacles and projecting terminals may be reversed between the charger and power pack. Furthermore, the central terminal/blade can be oversized instead of or in addition to the disclosed outer blades. Also, a non-conductive projection spaced outside of the terminals can act as the mechanical key for compatibility. The present invention can also be employed with other power tools such as screw drivers, bush trimmers, vacuum cleaners and kitchen blenders. Various materials, shapes and sizes have been disclosed, however, other materials, shapes and sizes may be readily substituted. It is intended by the following claims to cover these and any other departures from the disclosed embodiments which fall within the true spirit of this invention.

The invention claimed is:

1. A power pack charging system comprising:
 a hand-held apparatus;
 a first rechargeable power pack connectable to the apparatus and serving to operably energize the apparatus;
 a second rechargeable power pack connectable to the apparatus and serving to operably energize the apparatus, the power packs being interchangeably mounted to the apparatus; and
 a charger operable to energize the first power pack, the charger being mechanically prevented from completely engaging the second power pack, wherein the second power pack is substantially prevented from being energized by the charger.

2. The system of claim 1 further comprising:
 a first member of the first power pack operably interfacing with the charger; and
 a second member of the second power pack;
 the first member having a different configuration from the correspondingly positioned second member.

3. The system of claim 2 wherein the different configuration is the size, wherein the second member is too large to allow engagement of the second power pack with the charger.

4. The system of claim 3 wherein the width of the second member is greater than that of the first member.

5. The system of claim 2 wherein the different configuration includes a portion of the first member being electrically conductive and all of the second member being substantially non-conductive.

6. The system of claim 1 further comprising a projecting member preventing complete insertion of the second power pack in the charger.

7. The system of claim 6 wherein the size of the projecting member does not fit in an opening of the charger smaller than the projecting member.

8. The system of claim 7 further comprising at least a pair of substantially straight and parallel electrical terminals projecting from the second power pack wherein the projecting member is one of the electrical terminals.

9. The system of claim 1 further comprising:
 a temperature monitoring device; and
 an electrical connector mounted to the second power pack, the electrical connector including a positive current terminal, a negative current terminal and a third terminal electrically connected to the temperature monitoring device, the terminals outwardly projecting from the second power pack.

10. The system of claim 9 further comprising an electrical connector mounted to the first power pack including a positive current terminal, a negative current terminal and a substantially non-conductive blade projecting from between the terminals.

11. The system of claim 1 wherein the apparatus includes a cordless power tool.

12. The system of claim 11 wherein the second power pack includes nickel metal hydride batteries and the first power pack includes batteries of a different material than those of the second power pack.

13. The system of claim 1 further comprising a second charger operable to interchangeably supply electric current to both of the power packs.

14. A power tool charging system comprising:
 a first power pack;
 a second power pack;
 a first device operable to supply electrical current to both power packs; and
 a second device operable to supply electrical current to the first power pack but not to the second power pack.

15. The system of claim 14 further comprising:
 a first member of the first power pack operable to interface with the first device; and
 a second member located on the second power pack at a position corresponding to the position of the first member relative to the first power pack, the first member having a different configuration from the second member.

16. The system of claim 15 wherein the different configuration is the size.

17. The system of claim 16 wherein the width of the second member is greater than that of the first member.

18. The system of claim 15 wherein the different configuration includes one of the members being entirely electrically conductive and at least a portion of the other of the members being substantially non-conductive.

19. The system of claim 14 further comprising a projecting member preventing complete insertion of the second power pack in the second device.

20. The system of claim 19 wherein the size of the second member does not fit in an opening of the second device which is matable with the first power pack.

21. The system of claim 20 further comprising at least three substantially straight electrical terminals projecting from the second power pack wherein the projecting member is at least one of the terminals.

22. The system of claim 14 further comprising:
 a temperature monitoring device; and
 an electrical connector mounted to the second power pack, the electrical connector including a positive current terminal, a negative current terminal and a third terminal electrically connected to the temperature monitoring device, the terminals outwardly projecting from the second power pack.

23. The system of claim 22 further comprising an electrical connector mounted to the first power pack including a positive current terminal, a negative current terminal and a substantially non-conductive blade projecting from between the terminals.

24. The system of claim 14 wherein said first device includes:

an outer housing having a recessed aperture for operably and interchangeably receiving a projecting portion of the power packs;

a circuit board located in the housing;

a set of electrical receptacles connected to the circuit board for interfacing with the engagable power packs; and an alternating current electric plug connected to the circuit board.

25. The system of claim 14 further comprising a handheld power tool interchangeably engagable with the power packs, an electric motor located in the tool.

26. A power pack electrical connector comprising:

a base having an at least partially circular peripheral shape;

at least three substantially parallel blades projecting from a face of the base, the base and blades being integrally molded from a polymeric material;

a first conductor located on an external portion of a first of the blades;

a second conductor located on an external portion of a second of the blades; and a third conductor located on an external portion of a third of the blades;

the second blade having a different configuration than the first and third blades.

27. The electrical connector of claim 26 wherein a portion of the second blade facing the first blade is substantially non-conductive.

28. The electrical connector of claim 27 wherein a majority of the external portion of the second blade is free of the conductor, and a portion of the first blade is substantially non-conductive.

29. The electrical connector of claim 26 wherein the second blade has a greater lateral dimension as compared to the first and third blades.

30. The electrical connector of claim 26 further comprising a length of the second blade being longer than that of the first and third blades.

31. The electrical connector of claim 26 wherein each of the conductors wrap around the respective blade in a U-shaped manner.

32. The electrical connector of claim 26 further comprising conductive leads protruding from the base being electrically connected to the conductors, the leads and conductors being insert molded as an integrally formed member with the base.

33. The electrical connector of claim 26 further comprising a temperature sensor electrically connected to the second conductor.

34. A method of using a one-way compatible battery recharging system for a power tool, the system having a first power pack, a second power pack of a different material than the first power pack, and a charger, the method comprising:

(a) connecting the first power pack to the power tool;

(b) connecting the second power pack to the power tool after disconnection of the first power pack;

(c) recharging the first power pack by the charger; and (d) mechanically preventing the second power pack from being charged by the charger.

35. The method of claim 34 further comprising interchangeably recharging both power packs in a second charger.

36. The method of claim 35 further comprising transmitting a signal from the second power pack to the second charger indicative of the temperature of the second power pack during recharging.

37. The method of claim 34 further comprising abutting a portion of an electrical connector of the second power pack against a segment of the charger to deter complete engagement of the second power pack with the charger.

38. The method of claim 34 further comprising recharging the first power pack which is a nickel cadmium power pack by the charger but preventing the second power pack which is a nickel metal hydride power pack from being recharged by the charger.

* * * * *